J. A. Cummings.
Artificial Gums & Palate.

No. 43,009.        Patented June 7, 1864.

FRONT.

SOFFIT.

SECTION.

Witnesses:

Inventor:
John A Cummings
by
his atty

UNITED STATES PATENT OFFICE.

JOHN A. CUMMINGS, OF BOSTON, MASSACHUSETTS.

IMPROVEMENT IN ARTIFICIAL GUMS AND PALATES.

Specification forming part of Letters Patent No. 43,009, dated June 7, 1864.

*To all whom it may concern:*

Be it known that I, JOHN A. CUMMINGS, of Boston, in the county of Suffolk and State of Massachusetts, have invented certain new and useful Improvements in the Manner of Forming Artificial Palates and Gums Used for Inserting Artificial Teeth; and I do hereby declare that the following description, taken in connection with the accompanying drawings, hereinafter referred to, forms a full and exact specification of the same, wherein I have set forth the nature and principles of my said invention, by which it may be distinguished from others of a similar class, together with such parts as I claim and desire to have secured to me by Letters Patent.

The figures of the accompanying plates of drawings represent my improvements.

Figure 1:
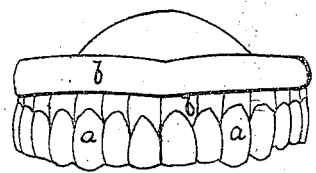
Figure 2:
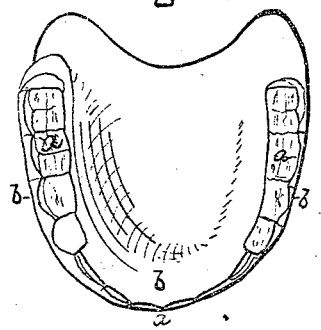
Figure 3:
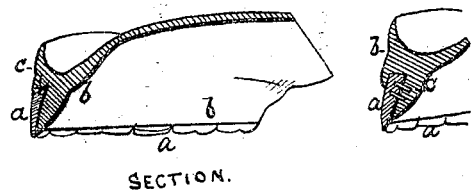

Figure 1 is a front elevation of a set of artificial teeth and plate formed by my improved method. Fig. 2 is a view of the lower side of the plate and teeth. Fig. 3 is a central vertical section of the same.

The method hitherto practiced of attaching artificial teeth to a metallic plate fitting to the roof of the mouth is attended with many objections and inconveniences, as the plate, being hard and unyielding, naturally hurts the mouth and in some degree impedes mastication and perfect articulation, while the expense of the metal employed prevents many from availing themselves of the advantages of artificial teeth.

The present invention consists in forming the plate and gums to which the teeth are attached of rubber or some other elastic material, so indurated as to be rigid enough for the purposes of mastication and pliable enough to yield a little to the motions of the mouth and in one piece, the teeth being embedded in the elastic material while the said material is in a soft condition and then baked with the gums and plate, so that the teeth, gums, and plate will all be connected, forming, as it were, one piece.

$a\ a\ a$ and $c$ in the drawings represent the artificial teeth prepared in the usual manner.

The plate and gums $b\ b$ are formed in one piece, and of rubber or of rubber and the compounds commonly employed therewith, or of gutta-percha, or, in fact, of any elastic substance which can be reduced to a soft condition and then vulcanized or hardened sufficiently to answer the purpose. The rubber or other material used is first molded to fit the shape of the mouth and the gums formed, and while soft and pliable the teeth $a\ a$ are embedded in the gums and as an additional security fastened to the same by small pins $c\ c$, Fig. 3. The teeth, gums, and plate, being thus connected, are then baked until the elastic material becomes sufficiently vulcanized, when the process is completed, the plate being hard and rigid enough for the purposes of mastication, and yet by its elastic nature yielding to the motions of the mouth, while the teeth are firmly embedded and secured in the gums.

The plate and gums can be colored in any proper manner to imitate nature.

Having thus described my improvements, I shall state my claim as follows.

What I claim as my invention, and desire to have secured to me by Letters Patent, is—

Forming the plate and gums in which the teeth are inserted in one piece of hard rubber or vulcanite—*i. e.*, an elastic material which can be hardened sufficiently for the purpose of mastication, and retain a portion of its elasticity so as to yield a little to the motion of the mouth—as herein set forth, and for the purposes specified.

JOHN A. CUMMINGS.

Witnesses:
    A. POLLOK,
    J. L. COOMBS.